E. E. TREVILLION.
NUT LOCK.
APPLICATION FILED APR. 11, 1912.
1,050,577.
Patented Jan. 14, 1913.
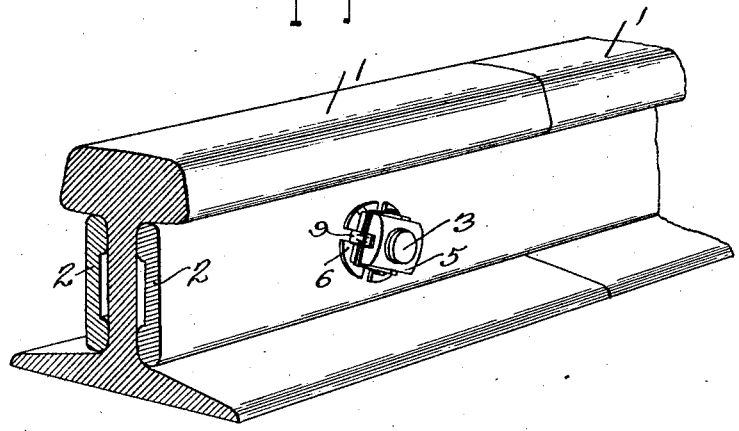
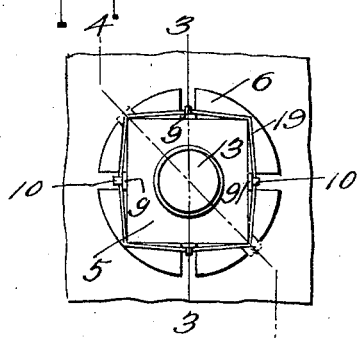
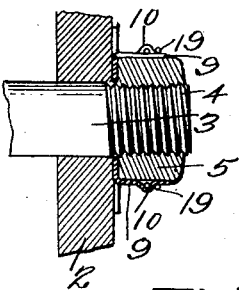
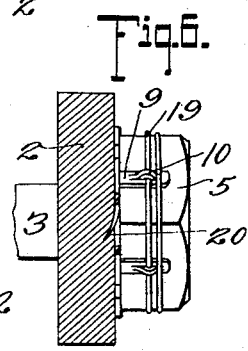
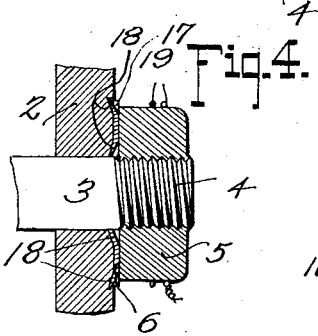
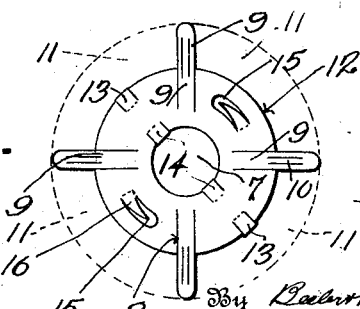
Witnesses
E. H. Wagner
D. E. Burdine
Inventor
E. E. Trevillion
By Baker & Robb
J. F. Robb, Attorneys

UNITED STATES PATENT OFFICE.

EDWARD E. TREVILLION, OF NEWELLTON, LOUISIANA.

NUT-LOCK.

1,050,577. Specification of Letters Patent. Patented Jan. 14, 1913.

Application filed April 11, 1912. Serial No. 689,953.

*To all whom it may concern:*

Be it known that I, EDWARD E. TREVILLION, a citizen of the United States, residing at Newellton, in the parish of Tensas and State of Louisiana, have invented certain new and useful Improvements in Nut-Locks, of which the following is a specification.

The present invention relates to nut locks, and while it more particularly relates to novel means for permanently locking the nuts onto fish plates of rails and to prevent the nuts from becoming loosened on account of vibration caused by trains passing over the rail joints, the invention broadly contemplates the provision of means for locking bolts and nuts against turning wherever it is desirable to lock a nut upon its bolt.

The object of the invention is to provide a device of the above character, by which the washer may be utilized between the nut and the member to be secured, to hold the nut against rotation and to provide such a construction of washer that the same may be held against rotation when applied to the fish plate or other member, and by the engagement of the washer with the nut to maintain the latter in a fixed position.

A further object is to so construct the parts with these ends in view that the invention may be applied to common forms of nuts and bolts without necessitating any changes whatever in their construction.

For a full understanding of the present invention, reference is to be had to the following description and to the accompanying drawings, in which—

Figure 1 is a perspective view showing the improved form of nut lock applied to a rail and fish plates. Fig. 2 is a top plan view of the nut lock. Fig. 3 is a sectional view of the same taken on the line 3—3 of Fig. 2. Fig. 4 is a sectional view on the line 4—4 of Fig. 2. Fig. 5 is a detail perspective view of a portion of the improved form of washer, particularly showing the upstanding arms provided with eyes, hereinafter referred to. Fig. 6 is a side elevation of the device partly in section. Fig. 7 is a plan view of the washer before the arms which engage the nut have been bent into operative position.

Throughout the following detail description and on the several figures of the drawings, similar parts are referred to by like reference characters.

Referring particularly to the drawings, 1 indicates sections of abutting rails and 2 the fish plates joining the same.

3 represents a bolt passing through the fish plates and web of the rail, said bolt having the ordinary threaded portions 4.

5 represents a nut of the ordinary construction but shown in the drawings as having a square form, and between the nut 5 and fish plate 2 is placed the improved form of washer 6, the particular construction of which forms the principal novel features of my invention.

In its essential features, the washer comprises a plurality of depending lips which are adapted to bite under lips formed on the fish plate, and which are adapted to be bent downwardly somewhat at the edges of the bolt hole. By the blow of a hammer, each lip on the fish plate may be forced downwardly upon the lip of the washer which it engages, and thus effectively maintain the washer against rotation or movement in any direction.

It further comprises a series of radial upstanding arms, each provided with an eye, and adapted to engage the sides of the nut, a wire being passed through the eyes entirely around the nut, and thus maintain the nut in a fixed position with reference to the washer.

The improved form of washer may be stamped from a single piece of metal, and no further workmanship is required other than slight manipulation to the portions which form the eyes before referred to.

I will now proceed to particularly describe the construction of the washer. It is provided in its central portion with an aperture 7, through which the bolt passes, and at preferably four diametrically opposite positions on the body of the washer, I cut the body at 8, the cuts extending from the outer periphery of the blank to a point adjacent to the aperture 7, thus forming a series of radial arms 9, each of which is slitted at 10, and on the insertion of a sharp instrument beneath the slitted portions, an eye will be formed on each arm of the shape shown particularly in Figs. 5 and 6. The outer portions 11 between the arms 9 of the blank are then cut away down to the edge 12, forming a washer such as particularly shown in Fig. 7. At preferably two diametrically opposite points of the peripheral edge 12, I cut the body of the washer so as to form a pair of depending lips 13, and the same operation is performed at preferably two points on an edge of the aperture 7, forming depending lips 14. I may further cut out portions of the washer at 15, and form the two depending projections or lips 16, which latter feature, however, is particularly useful when the washer is to be mounted on a wooden member instead of the ordinary fish plate.

While my invention may be applied to almost any metallic or wooden plates which it is desired to hold together by means of bolts and nuts, in the drawings, I have shown it as applied to an ordinary fish plate and as a coöperating feature with those just described with respect to the washer 6, I provide the fish plate at preferably two diametrically opposite points with small recesses 17 forming slightly upwardly inclined lips 18, the same being in a position corresponding to the position of the lips 13 formed on the washer.

When the parts are to be assembled, the washer 6 is passed over the threaded portion of the bolt 3 and the two lips 13 are brought to the position of the two recesses 17 formed in the fish plate, whereupon the lips are sprung into the recesses and under the corresponding lips 18 of the fish plate. This arrangement of the parts is best illustrated in Fig. 4 and after the parts are in the position described, a blow with a hammer is exerted on the portions of the washer surrounding the lips 13, and on the lips 17 of the fish plate, this operation tending to force the lips 13 into the recesses as far as they can go, and to force the lips 18 tightly down upon the lips 13. By virtue of this arrangement, a remarkably strong attachment of the washer to the fish plate is secured and rotation of the washer in any direction is prevented. At the same time, the lips 14 will be bent downwardly so as to tightly engage the edges of the bolt 3, this operation assisting in maintaining the washer against rotation.

It will be understood that by the method of forming the arms 9 on the washer hereinbefore described, a construction is afforded whereby nuts of the ordinary constructions and of varying sizes may be used in connection with the present invention, since each arm 9 may be bent at a point anywhere between the edge 11 and the innermost ends of the slits. After the washer has been fixed in position on the fish plate in the manner described, the nut 5 is then screwed upon the bolt 3, after which each of the arms 9 is bent upwardly into the position shown more particularly in Figs. 3, 5 and 6, so as to closely grasp the sides of the nut. A wire 19 is then passed through each of the eyes formed on the arms 9 so as to completely surround the nut, and its ends may be tied in any manner desired. A sufficient length may be used so as to pass twice around the nut and each time pass through the eyes or, as is shown in Fig. 6, the wire will pass through the eyes only during one of its windings about the nut, and on its second winding it may pass about the outer ends of the arms.

When a washer of the construction described and particularly shown in Fig. 7, is to be applied to a metallic member such as a fish plate, additional lips 20 may, if desired, be formed in the fish plate, to engage the lips or projections 16 formed in the washer and before referred to, the engagement being effected in the same manner as has been described in regard to the lips 13 and 18; or the washer may be applied and held in place by the engagement only of the lips 13 and 18, thus dispensing with the use of the lips 20. When, however, the invention is to be applied to wooden members, to hold the same in place, the lips 16 may be made to bite down into the wood, and thus effectively maintain the washer against rotation with respect to the wooden member with which it is placed in contact.

By the construction above described, it will be seen that I have provided a simple and inexpensive means of preventing the rotation of a nut upon its bolt and also of the washer with respect either to the bolt or the member against which it is placed. The washer being effectively secured against rotation either upon a fish plate or a wooden member, the arms will be held firmly against the sides of the nut by means of the wire which encompasses the nut and passes through the eyes formed in the arms and it will be obvious that by this means, any movement of the nut will be prevented. The washer being held against rotative movement with respect to the substructure, the wire will thus positively prevent movement of the nut with respect to the washer.

Having thus described the invention, what is claimed as new is:

1. In a nut lock, the combination of a washer adapted to surround a bolt and be disposed between a substructure and a nut, said washer having an outstanding arm stamped from the material of the washer and projecting outwardly a distance less than the thickness of the nut, the material of the arm being stamped into a laterally extending eye projecting away from the nut, and a cable adapted to surround the nut and extend through the eye.

2. In a nut lock, the combination of a washer adapted to surround a bolt and be arranged between a substructure and a nut, said washer having outstanding arms adapted to lie along opposite side faces of the nut and terminating short of the thickness of the nut, and each of said arms being formed with an eye intermediate its ends disposed laterally away from the nut, and a cable adapted to be wrapped about the nut and connecting the arms and extending through the eyes thereof.

In testimony whereof I affix my signature in presence of two witnesses.

EDWARD E. TREVILLION.

Witnesses:
J. W. HAZLIP,
F. W. KEIFER.

Copies of this patent may be obtained for five cents each, by addressing the "Commissioner of Patents, Washington, D. C."